United States Patent
Miller

[15] 3,698,051
[45] Oct. 17, 1972

[54] METHOD OF MAKING AN ACOUSTICAL TRANSDUCER

[72] Inventor: Darrow L. Miller, Los Angeles, Calif.

[73] Assignee: North American Rockwell Corporation

[22] Filed: Feb. 6, 1970

[21] Appl. No.: 9,239

[52] U.S. Cl. ..................29/25.35, 29/594, 310/8.1, 73/71.5
[51] Int. Cl. ..........................................H04r 17/00
[58] Field of Search ...29/25.35, 594; 73/67.8, 67.85, 73/67.9, 71.5; 310/8.1, 8.3, 8.7

[56] References Cited

UNITED STATES PATENTS

| | | | |
|---|---|---|---|
| 2,420,864 | 5/1947 | Chilowsky | 29/25.35 |
| 2,752,662 | 7/1956 | Crooks et al. | 29/25.35 |
| 2,846,874 | 8/1958 | Horn | 73/67.8 X |
| 3,177,382 | 4/1965 | Green | 310/8.7 |
| 3,242,552 | 3/1966 | Cowan | 29/594 UX |
| 3,496,617 | 2/1970 | Cook et al. | 29/600 X |

*Primary Examiner*—R. Spencer Annear
*Attorney*—L. Lee Humphries

[57] ABSTRACT

A method of constructing an acoustical transducer in roller shape wherein the transducing structure is a plurality of piezoelectric segments about the circumference of the roller. The method includes the precision boring to size of the inside and outside diameters of an oversize piezoelectric tube which has been fired but is still in the unpolarized state. An electrical coating is then deposited on the inside and outside diameter and the tube is electrically polarized. The tube is filled with a low exotherm electrically conductive acoustical damping material which is allowed to harden. The tube is then divided into a plurality of parallel sections and cut into several individual roller acoustical transducers, each transducer having a plurality of individual segments.

16 Claims, 4 Drawing Figures

PATENTED OCT 17 1972 3,698,051

DARROW L. MILLER
INVENTOR.

BY
ATTORNEY ed States Patent 3,698,051

METHOD OF MAKING AN ACOUSTICAL TRANSDUCER

BACKGROUND OF THE INVENTION

The non-destructive testing of manufactured articles to locate structural defects therein is widely practiced in modern industry. Such testing is of particular importance in high speed aircraft and space vehicles wherein use of composite panels, either laminates or sandwich type, is widespread. Such composite structures often exhibit strength characteristics equivalent to solid material, while being of a substantially lighter weight. To maintain the strength of the completed structure, it is necessary to detect any areas in which a satisfactory bond has not occurred. Many structural components in the field such as composite panels in an aerial vehicle cannot be conveniently inspected by conventional ultrasonic methods after complete and perpermanent installation of the panels. Also, since disbonds may occur in composite panels periodically during the service life of an aircraft it is necessary to inspect the aircraft structure not only during it initial fabrication but many times thereafter between flights. It should be noted that some supersonic aircraft contain as much as 20,000 square feet of bonded panels in their structure, whereby periodic inspection involves a considerable and almost continuous effort.

Heretofore, it has been found most desirable to employ an ultrasonic probe to discover disbonds in composite structures in a non-destructive manner. Ultrasonic probes when employed with conventional electronic equipment produce a pulse of ultrasonic energy which is transmitted within the structure of the workpiece. The energizing signal is reflected and/or attenuated upon coming into contact with any discontinuity within the workpiece, and this reflection or change in receiving signal amplitude is picked up by the probe and displayed by some conventional means such as an oscilloscope. The acoustical pulse is usually produced by the application of the piezoelectric effect. The piezoelectric effects refers to the property of certain materials of a crystalline structure (typically barium titanate, lead zirconate, lead metaniobate) to physically vibrate upon application of a voltage gradient thereto producing a pulse of ultrasonic energy. The crystal structure of the probe physically deforms and produces pulses at a rate coinciding with variations in the excitation signal. The resultant electric pulses are transmitted to the workpiece and any discontinuities within the workpiece are detected by the reflection and/or attenuation of the return signal.

The most common type of acoustical probe used for ultrasonic inspection has been typically of a flat disc form. To effect the efficient transmission of the electric pulse into the workpiece and accurate sensing of the reaction, the flat disc probe typically requires the use of a liquid or a paste couplant which wets the workpiece surface and the probe itself thereby coupling the workpiece and the probe together acoustically. The probe is then moved translationally across the workpiece surface in sliding contact relationship with the intervening film of couplant. Any disbonds located within the workpiece are then detected by analysis or comparison of each energizing pulse with its corresponding reflected pulse.

There are several disadvantages associated with the use of flat disc probes. Workpiece surfaces which are extremely rough or otherwise exhibit high friction in respect to the probe are difficult or impossible to inspect by such a probe except by complete immersion of both the probe and the workpiece within a water couplant. Such an immersion would be completely impossible when attempting to discover disbond areas within the structural surface of an aircraft. Additional disadvantages of the wet coupling method are that the couplants are messy, costly, involve risk of corrosion, contamination and usually leave residual traces.

To overcome the disadvantages of the wet coupling method, a roller type of probe has been employed as disclosed in my co-pending application Ser. No. 832,568, filed June 12, 1969. Roller type probes as suggested in the stated patent application are designed in the shape of a continuous surface cylinder of piezoelectric material. As the roller incurs only a line contact with the workpiece surface, such rollers facilitate the inspection of rough or high friction materials. To avoid the use of a wet couplant in the employment of the roller probe, a dry couplant has been employed as disclosed and claimed in my said patent application. It has been found that such a satisfactory dry couplant may be achieved by a glass cloth upon which is applied an adhesive or silicon resin to which are adhered a layer of glass beads about five microns in diameter. Such a dry couplant forms a good mechanical bond with the workpiece and permits efficient energy transmission in the same manner as the wet couplant.

Roller tubes of the mentioned type have not been difficult or costly to manufacture. The roller tube or hoop configurations operate at a low range resonant frequencies (10 KHz to 500 KHz), where either the tube thickness mode or the radial mode of vibration resulted in a tube geometry with a thick cross section relative to the tube diameter such as a nominal thickness ranging from 0.125 inch to 0.250 inch and a diameter ranging from 0.5 inch to 3 inches. These tube configurations are structurally sound and are not hard to make. Thus, present methods of manufacturing piezoelectric materials into specific geometric configurations involve the dry molding of finely ground polycrystalline ceramic compounds (lead-titanate or lead-zirconate materials) at pressures up to 16,000 psi into the desired high density material configuration. The green ceramic forms thus achieved are cured at elevated temperatures until a porcelain-like solid device is obtained. The active surfaces are deposited with a conducting material, usually silver, and polarized at a high dc potential to make them piezoelectric. Because the silver ground polycrystalline ceramic compounds are pressed to a high density in the "dry" form, the material does not flow and only specific geometric shapes and configurations can be formed, such as tube, disk, rods, etc. Other forms involving compound curves can be achieved only by costly, difficult and complex grinding operations on an initial blank. Sometimes this is accomplished in the green state (before baking in a high temperature kiln). If forming operations on a blank are done, the material is extremely hard and requires diamond-faced or silicon carbide tools for all cutting operations.

The low frequency (10 KHz to 500 KHz) continuous wave probe has an unbroken outside diameter and radiates energy throughout 360°. In contrast, a high frequency (1 MHz to 15 MHz) segmented probe has only one segment active. This segment is in contact with the sample. The high pulse echo frequencies employed provide extreme resolution compared with the low frequency device.

The curved segments described above were first made by cutting each segment from a cured, polarized tube configuration. They are difficult and expensive to make, cannot be made in the proposed combined trapazoidal and curved segment shape. The wall thickness was limited to a minimum of 0.035 inches (approximately 2 MHz to provide a half-wave thickness).

SUMMARY OF THE INVENTION

The method as defined by this invention relates to the manufacture of a piezoelectric segmented roller probe which is to be employed in rapid, non-destructive inspection for internal defects within both composite and solid type structures. A hollow, cylindrical, ceramic element approximately ⅛ of an inch thick, similar to the type of element which is employed in the continuous roller type of probe, is formed and cured in the normal manner. The tube is precision bored on the inside to fit a mandril and held in place with a low melting temperature wax or similar material. The outside surface is then precision ground to provide a true roundness through 360° to the central axis leaving the tube still greatly oversize. Where the finished half wave wall thickness is relatively thick, the tube can be ground completely to a half wave wall thickness and removed from the mandrel by melting the wave. The final grinding process and remetalizing of the exterior surface delineated in a later step of the manufacturing process would be omitted. A metallic polarization film is then deposited on the inside and outside diameter of the tubular element. The entire structure is electrically polarized to make the polycrystalline cylindrical element piezoelectric. The tubular element is then filled with a low exothern epoxy acoustical damping material. One such material, which has been found to be satisfactory, comprises a mixture of 1 part Versamide 140, 1 part epon 150, and powdered metal. The damping material can preferably be placed within the tubular element in a liquid form and then given time to cure or it possibly can be premolded and fixed in position by a liquid adhesive. Using the precision ground exterior of the tube as a reference, a central axis is then bored lengthwide through the core material. This axis will be used upon completion of the probe to facilitate its rotation upon the workpiece. The combination of the cylindrical element and the core material is placed within an appropriate apparatus and the cylindrical ceramic element precision ground with a silicon carbide J11 or J12 tool to the desired half-wave thickness. Upon achieving the desired cylindrical wall thickness, a metallic film is deposited on the outside surface thereof. The piezoelectric material of the cylindrical element is then slotted longitudinally to form a plurality of spaced slots formating long separate parallel sections. The slot is cut slightly deeper than the piezoelectric material is thick. The number of sections depends on the diameter and other design considerations. For a 1½ inch diameter tube, 20 sections might be employed.

The slotting may be accomplished in a direction parallel to the bored axis hole or it may be accomplished at an angle with respect thereto. If the slotting is accomplished at an angle, a plurality of parallelogram shaped sections result instead of substantially rectangular shaped sections. Upon completion of the slotting procedure, the completed assembly is then cut into a predetermined number of individual piezoelectric roller transducers of a wheel-like shape. Each roller having a number of individual piezoelectric segments spaced about its circumference. The completed transducers can be provided with a layer of adhesive elastomers exteriorly thereof with a layer of particulates being secured to the outside surface.

DETAILED DESCRIPTION OF THE INVENTION

Figure 4:
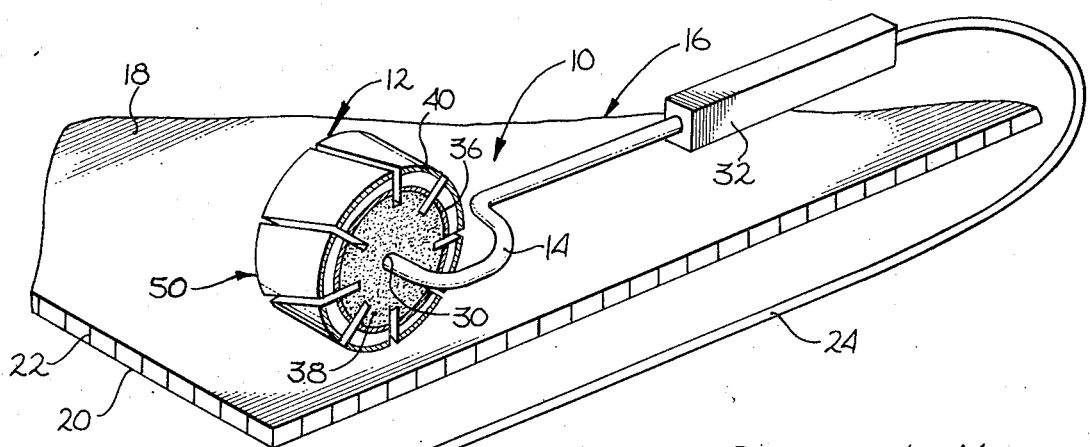
FIG. 4 is a perspective view of a completed probe assembly of the embodiment shown in FIG. 3 which has been installed within appropriate structure to effect movement and operation of the probe upon a workpiece.

Referring particularly to the drawing and specifically to FIG. 4, the apparatus formed by the method of this invention comprises a device for nondestructive testing or inspection which may illustratively take the form of a manually operated probe 10 having a rotatable portion 12 being supported by support rod 14. Probe 10 is shown in operative relationship with a workpiece of a light-weight composite panel 16 having upper and lower face sheets 18 and 20, respectively, with a lightweight core material 22 secured therebetween. Probe 10 is energized by an electrical connection 24 with a suitable source 26 which may take various forms known to the prior art, the details of which are beyond the scope of the invention defined by this application.

Support rod 14 is rotatively secured within central opening 30 of roller core 38. Attached to the outer extremity of support rod 14 is a handle 32 to facilitate manual grasping and movement of the probe 10. It is to be understood that an inspection of composite panel 16 is performed by traversing one surface of the panel 16, such as face sheet 16 with rotatable portion 12, by application of force to handle 28 of probe 10. The action thus achieved is far more rapid and effective than the sliding movement of a flat probe such as known in the prior art, particularly when the contacting surface of a given workpiece is rough, uneven, curved, or characterized by high friction materials.

It will be further understood that acoustical transmission between crystal surface 34 and the composite panel 16 may be significantly enhanced by the use of one or more couplants many of which are known and widely used in industry. Although the probe 10, formed by the method of this invention will work satisfactorily when employed with many of the wet couplants presently employed in the prior art, it is the intention of applicant that the probe is to be employed with a dry couplant media comprising a layer of adhesive elastomer upon which has been applied a layer of particulates.

To form the roller probe 10 by the method of this invention, a hollow, cylindrical crystal surface 34 is formed of a ferro-electric ceramic material of the type commonly used in acoustical probes and the like. Such material is characterized by a propensity to distort or deform upon application of an electrical signal thereto, such deforming being referred to as the piezoelectric effect. In some instances, material 34 could be composed of lead titanate, lead zirconate or other similar materials. The thickness of the tubular crystal structure 34 is chosen to be greater than that desired in the final configuration. Upon the tubular structure being formed to its desired diameter and thickness, the crystal is then cured as by a conventional baking operation which is used to cure all ceramic materials. The tube is precision bored to fit a mandrel and held in place with a low temperature wax or similar material. The outside surface is then ground to form a true roundness through 360° to the central axis leaving the tube still oversize. (Where the finished half wave wall thickness is to be relatively thick, the tube can be ground completely to its half wave wall thickness and removed from the mandrel by melting the wax. The final grinding process and remetalizing of the exterior surface delineated in later process steps would be omitted.) A metallic polarization coating 36 is applied to the inside diameter of tubular crystal surface 34. The entire tubular crystal surface 36 is then electrically polarized thereby making the polycrystalline material of crystal surface 34 and 36 piezoelectric. The composition of coating 36 is not significant except such coating must be electrically conductive. Coating 36 will be employed to permit application of electrical signals to the crystal surface 34. One such metallic material which has proved to be satisfactory for coating 36 is silver or an alloy thereof which may be electrodeposited on the surface.

The hollow portion within the crystal surface 34 is then filled with an electrically conductive acoustical damping material. One such material which has proved to be most satisfactory would be a mixture of epoxy and powdered metal. An opening 30 is bored longitudinally through the core material 38 coinciding with the longitudinal axis of the cylindrical crystal surface 34. Continuous crystal surface 34 is then reduced to the desired wall thickness which has been predetermined. It is to be understood that the wall thickness determines the frequency at which the roller probe 10 of this invention operates. It is envisioned that the reducing of the wall thickness would be accomplished as by grinding off the excess piezoelectric crystal surface material. However, any desirable or satisfactory means to accomplish the reducing to size of the wall thickness of the crystal surface will be most satisfactory. A polarizing metallic coating 40 is then applied to the exterior surface of crystal surface 34. The coating 40 is normally identical to coating 36. Normally such coatings 36 and 40 will be applied as by electro-depositing, however if the core has been previously filled, outgassing will occur in this process and any conventional means of applying the film to the crystal surface 34 will be satisfactory.

It is to be noted that in some instances the reducing of the wall thickness of the crystal surface 34 may be accomplished prior to the baking or curing step of the crystal surface 34. Once the surface 34 is cured, a substantially greater hardness is achieved and also the structure is more brittle. Therefore, to avoid any possibility of forming defects in the surface 34 and to increase the speed of reducing the wall thickness of the crystal 34, it may be desirable to effect the reducing of the wall thickness in this green state prior to the curing procedure.

Figure 1:
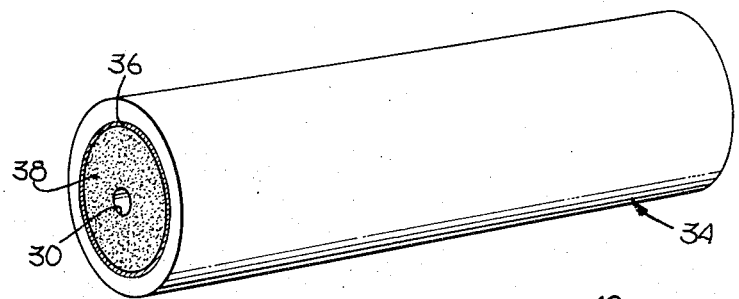
FIG. 1 is a perspective view of the cylindrical piezoelectric element having the internal core assembly during an intermediate step of fabrication of the roller transducer of this invention.
Figure 2:
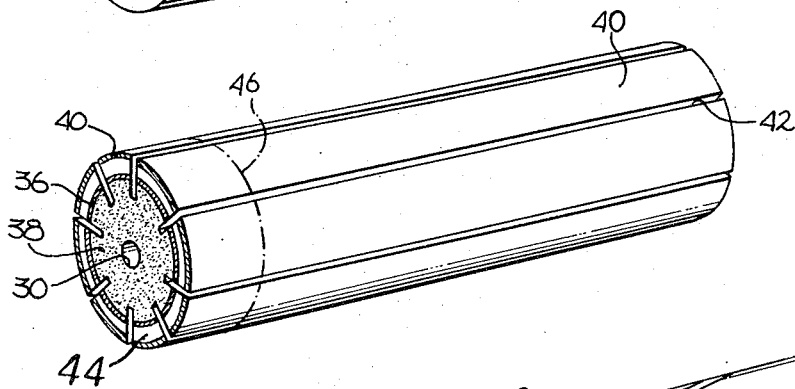
FIG. 2 is a perspective view of the roller probe of this invention which has been slotted in a direction parallel to the axis of the cylindrical probe.

Referring particularly to FIG. 2 of the drawing, the crystal surface 34 may then by cut radially by a plurality of longitudinal slots 42. The depth of each slot 42 extends within the core material 38 thereby separating crystal surface 34 into a plurality of separate segments 44. Slots 42 are in a direction parallel to central opening 30. The exact number of segments 44 is to be considered to be a matter of choice or design, and the method of this invention should in no way be limited as to the specific number of such segments. Once these segments 44 have been formed, the tubular crystal surface 34 is then sliced as shown by phantom line 46, thereby forming a roller probe of the desired width (as in FIG. 4). It is to be understood that a number of probes can be formed from each tubular crystal.

Figure 3:
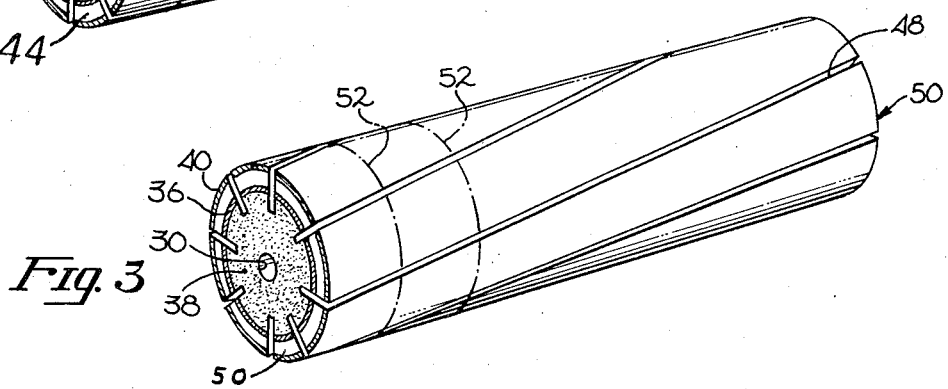
FIG. 3 is a view similar to FIG. 2 wherein slotting is accomplished in an angle with respect to the axis of the probe resulting in parallelogram shaped probe segments.

Referring to FIG. 3 of the drawing, radial slots 48 divide the crystal surface 34 into a plurality of segments 50. It is to be noted that slots 48 are not parallel to central opening 30 but extend at an angle with respect thereto. As a result, each of the segments 50 thus formed are not substantially rectangularly shaped as in the embodiment of FIG. 2 but are in the shape of a parallelogram. Each of the slots 48 also extend within core material 38 as slots 42. The longitudinal crystal surface 34 is then sliced into a plurality of roller probes having the desired width as represented by phantom line 52. The desirability of the parallelogram shaped segments as shown in FIG. 3 over the rectangular shaped segments as shown in FIG. 2 is that, as the rotatable portion 12 of the probe 10 is moved upon the workpiece surface, contact with the workpiece is in a line direction parallel to central opening 30. Therefore, as one of the slots 48 comes into contact with the workpiece surface 18 the fore end of one segment 50 is in contact with the workpiece surface and also the aft end of an adjacent segment is also in contact with the workpiece surface 18. Therefore, a continuous couple is created which is not influenced by the gaps of slots 48. In other words, a more efficient contacting relationship between the rotatable portion 12 is effected between the segments 50 and the workpiece surface 18.

It is to be noted that the contacting relationship of both the segments 44 and 50 is in essence a line with the upper face sheet 18 of the composite panel 16.

It is to be understood that a couplant must be employed between the segments 44 or 50 and the workpiece surface 18 to effect the efficient acoustical energy transmission therebetween. Although either wet or dry couplants could be employed, it has been found in the past to be most desirable to employ the use of a dry couplant such as has been discussed previously in this application. Illustratively, one desirable form of such a dry couplant includes the use of an adhesive elastomer upon which is secured a layer of particulates as glass beads of an extremely small diameter (about 5 microns). It is to be understood that the couplant itself forms no part of the method of this invention, it merely being disclosed to complete the description of the roller probe thus formed by the method of this application, such a couplant being necessary to effect use of the roller probe manufactured by the method of this invention.

The electrical connections to the individual segments 44 and 50 are not described within this application. It is to be understood that the electrical pulse causing each segment 44 and 50 to deform due to the piezoelectric effect is transmitted to the segment through coating 36 and 40. The electrical connections with the coatings 36 and 40 can be accomplished by a conventional commutating arrangement. Such a commutating arrangement is readily known in the art and need not be described here.

I claim:

1. A method of making an ultrasonic probe for nondestructive inspection of a workpiece to locate internal structural defects therewithin, said method including:
    forming a piezoelectric material into a hollow cylinder;
    curing said cylinder to harden the same into a tubular crystal structure;
    applying a metallic coating on the interior and exterior of said cylinder;
    filling the interior portion of said cylinder with acoustical damping material; and
    dividing said tubular crystal structure into a plurality of separate arcuate segments.

2. The method of claim 1 wherein the step of dividing includes:
    forming each segment substantially in the shape of a rectangle.

3. The method of claim 1 wherein the step of dividing includes:
    forming each segment substantially in the shape of a parallelogram.

4. A method of making an ultrasonic probe for nondestructive inspection of a workpiece to locate internal structural defects therewithin, said method including:
    forming a piezoelectric material into a hollow cylinder,
    curing said cylinder to harden the same into a piezoelectric crystal,
    applying a metallic coating on the interior and exterior surfaces of said cylinder,
    filling the interior of said cylinder with acoustical damping material,
    dividing said cylindrical crystal structure into a plurality of separate rings, and
    slotting each of said rings into a plurality of individual segments.

5. The method of claim 4 wherein the step of slotting includes:
    forming each segment substantially in the shape of a rectangle.

6. The method of claim 4 wherein the step of slotting includes:
    forming each segment substantially in the shape of a parallelogram.

7. A method of making a probe usable to nondestructively inspect a workpiece to locate internal structural defects therewithin; said method including:
    forming a tubular cylindrical crystal structure which is capable of exhibiting the piezoelectric effect;
    applying a metallic polarization coating on the interior cylindrical surface of the crystal structure;
    filling the interior portion of the crystal structure with acoustical damping material;
    applying a metallic polarization coating on the exterior cylindrical surface of the crystal structure; and
    slotting the crystal structure lengthwise to form a plurality of acoustically separated piezoelectric segments.

8. The method as defined in claim 7 wherein the step of slotting includes:
    locating the slots at an angle to the central longitudinal axis of the crystal structure thereby forming parallelogram shaped arcuate segments.

9. The method as defined in claim 7 wherein:
    the step of forming includes selecting a crystal structure of a greater thickness than desired; and
    after the step of filling, reducing the crystal structure in thickness to a desired minimum thickness.

10. The method as defined in claim 9 wherein:
    the crystal structure is cured to the desired hardness prior to the reducing in thickness, and
    said reducing in thickness is by grinding said cured crystal structure.

11. The method as defined in claim 9 wherein:
    the crystal structure is cured to the desired hardness after said reducing in thickness.

12. The method as defined in claim 9 wherein the step of slotting includes:
    locating the slots at an angle to the central longitudinal axis of the crystal structure thereby forming parallelogram shaped arcuate segments.

13. A method of making a probe usable to nondestructively inspect a workpiece to locate internal structure defects therewithin, said method including:
    employing a tubular cylindrical crystal structure of ferroelectric ceramic material of a thickness greater than desired;
    applying an electrically conductive coating upon the interior surface of the crystal structure;
    filling the interior portion of the crystal structure with an acoustical damping material thereby forming a central core;
    boring an axis centrally located longitudinally within the core;
    reducing the wall thickness of the crystal structure to the desired value of thickness;
    applying an electrically conductive coating upon the exterior surface of the crystal structure;
    electrically polarizing the crystal structure making the structure piezoelectric;
    dividing the crystal structure into a plurality of acoustically separated segments; and
    cutting the crystal structure and core into a plurality of individual probes.

14. The method as defined in claim 13 wherein:
    the step of dividing includes forming the segments substantially in the shape of a parallelogram.

15. The method as defined in claim 14 further including:

applying a dry couplant about the exterior electrically conductive coating.

16. The method as defined in claim 15 further including:
  providing means to apply an electrical charge to the interior electrically conductive coating; and
  providing means to receive an electrical charge from the exterior electrically conductive coating.

* * * * *